United States Patent
Didierjean

(10) Patent No.: US 11,046,177 B2
(45) Date of Patent: Jun. 29, 2021

(54) CONTROL METHOD FOR HYDRAULIC ASSISTANCE

(71) Applicant: POCLAIN HYDRAULICS INDUSTRIE, Verberie (FR)

(72) Inventor: Claude Didierjean, Verberie (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 0 days.

(21) Appl. No.: 16/633,950

(22) PCT Filed: Jul. 20, 2018

(86) PCT No.: PCT/FR2018/051863
§ 371 (c)(1),
(2) Date: Jan. 24, 2020

(87) PCT Pub. No.: WO2019/020912
PCT Pub. Date: Jan. 31, 2019

(65) Prior Publication Data
US 2020/0215909 A1 Jul. 9, 2020

(30) Foreign Application Priority Data

Jul. 24, 2017 (FR) ...................................... 1757014

(51) Int. Cl.
*B60K 23/08* (2006.01)
*B60W 10/04* (2006.01)
*B60W 10/18* (2012.01)

(52) U.S. Cl.
CPC ............. *B60K 23/08* (2013.01); *B60W 10/04* (2013.01); *B60W 10/18* (2013.01); *B60K 2023/0866* (2013.01); *B60W 2552/15* (2020.02)

(58) Field of Classification Search
CPC . B60K 23/08; B60K 2023/0866; F16H 59/18; F16H 59/44; F16H 59/48;
(Continued)

(56) References Cited

U.S. PATENT DOCUMENTS 6,170,587 B1 * 1/2001 Bullock ................... B60K 1/02
180/69.6
6,367,572 B1    4/2002 Maletschek et al.
(Continued)

FOREIGN PATENT DOCUMENTS

| EP | 0993982 A1 | 4/2000 |
|---|---|---|
| FR | 2927040 A1 | 8/2009 |
| FR | 3043372 A1 | 5/2017 |

*Primary Examiner* — Huan Le
(74) *Attorney, Agent, or Firm* — The Webb Law Firm

(57) ABSTRACT

A method for controlling a vehicle including a main transmission and a hydraulic transmission, in which, in the absence of a setpoint on the brake, and when the hydraulic transmission is activated, a hydraulic pump of the hydraulic transmission is controlled in such a way as to establish a predetermined pressure inside a hydraulic circuit of the hydraulic transmission, and in the event of a setpoint applied to the brake, the hydraulic transmission is then controlled according to an acceleration setpoint applied to the vehicle. If the acceleration setpoint is greater than or equal to an acceleration threshold value, and the speed of travel of the vehicle is less than or equal to a speed threshold value, the hydraulic transmission is controlled in such a way as to apply a tractive force. If the acceleration setpoint is less than the first threshold value, the hydraulic transmission is disengaged.

7 Claims, 2 Drawing Sheets

(58) Field of Classification Search
CPC ....... F16H 59/54; B60W 10/04; B60W 10/18; B60W 2552/15; B60W 40/076
See application file for complete search history.

(56) References Cited

U.S. PATENT DOCUMENTS

| | | | |
|---|---|---|---|
| 2009/0055061 A1* | 2/2009 | Zhu ..................... | F16H 61/4096 701/55 |
| 2011/0178684 A1* | 7/2011 | Umemoto ............... | F02D 31/00 701/51 |
| 2018/0231030 A1* | 8/2018 | Kanenobu ............... | F15B 21/04 |

* cited by examiner

CONTROL METHOD FOR HYDRAULIC ASSISTANCE

CROSS-REFERENCE TO RELATED APPLICATIONS

This application is the United States national phase of International Application No. PCT/FR2018/051863 filed Jul. 20, 2018, and claims priority to French Patent Application No. 1757014 filed Jul. 24, 2017, the disclosures of which are hereby incorporated by reference in their entirety.

FIELD OF THE INVENTION

The present disclosure relates to the hydraulic assistance systems for a vehicle, and more specifically to the piloting of such a system.

STATE OF THE PRIOR ART

The advantage of a hydraulic transmission which allows delivering a high torque at moderate speeds is known.

The hydraulic transmission is typically used as an assistance transmission, associated with a main mechanical transmission. For example, European Patent EP 0 993 982 discloses the combined use of a hydraulic transmission and a mechanical transmission. In this case, the hydraulic transmission is used under particular conditions, particularly to provide an assistance of the mechanical transmission under traveling conditions that require it, for example in case of loss of adhesion of at least one of the wheels of the vehicle when it travels on slippery ground such as a construction site.

Whether it is the main transmission or an assistance transmission, the hydraulic transmission can be used under difficult traveling conditions. In some cases, it must be used at very low speed, for example when the vehicle is traveling on a particularly slippery or uneven ground, in particular to cross over an obstacle such as a speed bump or curb, or to get over a rut, in particular in the mud. In such a situation, the hydraulic transmission must deliver a significant torque and drive the wheels at very low speed but sufficient enough to allow the vehicle to circulate and, where necessary, to get past the obstacle.

Conventionally, due to the nature of the hydraulic assistance transmission, the latter is disengaged when the user actuates a command for braking the vehicle.

The present disclosure proposes to take advantage of a hydraulic assistance of a hydraulic transmission under conditions that are not considered by the current systems.

SUMMARY OF THE INVENTION

For this purpose, the present disclosure relates to a method for controlling a vehicle comprising a main transmission configured to drive in rotation a first set of wheels, and a hydraulic transmission configured to drive in rotation a second set of wheels, the vehicle being provided with a brake,
wherein
in the absence of braking setpoint on the brake, and when the hydraulic transmission is activated, a hydraulic pump of the hydraulic transmission is piloted so as to establish a predetermined pressure within a hydraulic circuit of the hydraulic transmission, in case of braking setpoint applied to the brake, the hydraulic transmission is then piloted as a function of an acceleration setpoint applied to the vehicle;
if the acceleration setpoint is greater than or equal to an acceleration threshold value, and the traveling speed of the vehicle is lower than or equal to a speed threshold value, the hydraulic transmission is piloted so as to exert a tractive force,
if the acceleration setpoint is lower than the first threshold value, the hydraulic transmission is disengaged.

In the present disclosure, "brake" will refer to a system for maintaining a vehicle stationary before starting the latter, for example in start-up situation on a slope. Such brakes are commonly referred to as "parking brake" or "service brake", on the understanding that other braking systems can perform such a function.

According to one example, the hydraulic transmission is disengaged when the speed of the vehicle exceeds a speed threshold value.

According to one example, in case of braking setpoint applied to the brake, the hydraulic transmission is also piloted as a function of an indication of the inclination of the vehicle.

The piloting of the hydraulic transmission so as to exert a tractive force is then typically modulated as a function of the inclination of the vehicle.

According to one example, in case of braking setpoint applied to the brake, the hydraulic transmission is also piloted as a function of a load indication of the vehicle.

The piloting of the hydraulic transmission so as to exert a tractive force is then typically modulated as a function of the load of the vehicle.

The present disclosure also relates to a vehicle comprising a transmission device configured to be controlled according to the method as defined above.

BRIEF DESCRIPTION OF THE DRAWINGS

The invention and its advantages will be better understood upon reading the detailed description given below of various embodiments of the invention given as non-limiting examples. This description refers to the pages of appended figures, in which.

In all the figures, the elements in common are identified by identical reference numerals.

DETAILED DESCRIPTION OF EXEMPLARY EMBODIMENTS

Figure 1:
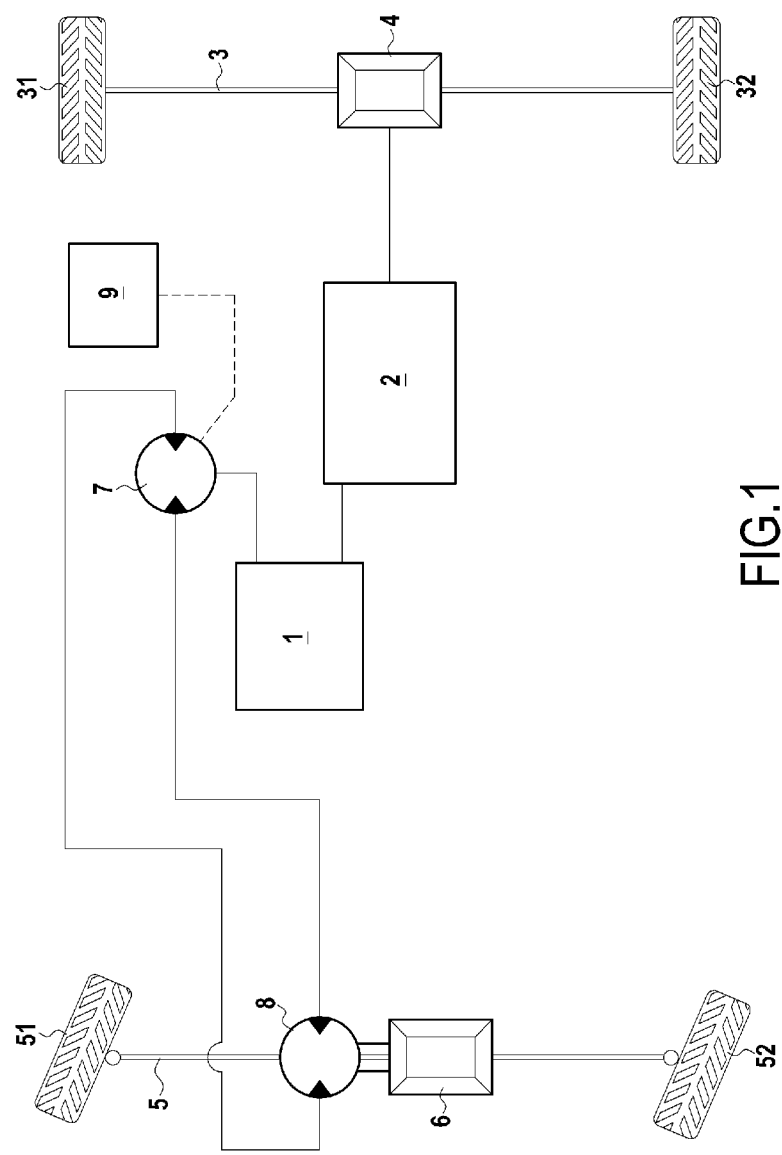
FIG. 1 schematically represents a vehicle provided with a hydraulic assistance on an axle, FIG. 2 schematizes the operation of a hydraulic assistance piloted via a piloting method according to the invention.

FIG. 1 schematically represents a vehicle provided with a hydraulic assistance on an axle.

This figure represents an engine 1 forming a drive for a first axle 3 provided with wheels 31 and 32, here represented equipped with a first differential 4. The engine 1 is typically a heat engine, connected to the differential 4 via a gearbox 2. The axle 3 is thus typically the axle referred to as "main" axle for the vehicle. More generally, the wheels 31 and 32 are main or usual drive wheels of the vehicle.

The vehicle is also equipped with a hydraulic assistance transmission on a second axle 5 provided with a second differential 6 and two wheels 51 and 52, which are here represented as being steered wheels (it will be understood that this embodiment is given by way of example, and that the steered or non-steered nature of the wheels of the axle driven by the hydraulic assistance transmission has no impact on the invention). More generally, the wheels 51 and 52 are standard carrying wheels of the vehicle.

The hydraulic assistance transmission is here schematically represented as comprising a hydraulic pump 7 and a hydraulic motor 8.

A completely equivalent transmission can be provided by associating a hydraulic motor with each wheel 51, 52, the differential 6 being then able to be removed insofar as the wheels 51 and 52 are then not linked in rotation, thereby giving a differential effect. In this case, the motors associated with the two wheels 51 and 52 are hydraulically connected in parallel with the inlet and the discharge of the pump 7.

Whether it is the mounting with differential or the mounting without differential, the motor 8 can rotate at wheel speed, or a step-up or step-down ratio can exist between the motor 8 and the wheels 51, 52.

The hydraulic pump 7 is coupled to the engine 1 which thus allows ensuring the drive. The hydraulic pump 7 thus delivers a flow rate to the hydraulic motor 8, so as the latter applies a motor torque on the second axle 5.

the hydraulic motor 8 is typically a radial-piston and fixed-displacement hydraulic apparatus. The hydraulic pump 7 is typically an axial-piston and variable-displacement hydraulic apparatus, which can alternate between a freewheel configuration in which they have zero displacement (for example by retraction of pistons in their respective housings, or by disengagement of the cylinder block for radial-piston machines, or by zero displacement positioning of the table of an axial-piston machine), and a service configuration (in which the displacement is non-zero). It will be understood that the operation remains unchanged in a configuration where the hydraulic pump 7 drives several hydraulic motors. More generally, the present disclosure applies for a hydraulic pump 7 associated with n hydraulic motors, with n being non-zero natural integer.

In operation, it is the engine 1 that ensures the "main" driving of the vehicle. The hydraulic assistance transmission is typically engaged under particular conditions, for example in case of loss of adhesion or for crossing over obstacles, and more particularly under traveling conditions at low speed.

When the hydraulic assistance transmission is put into operation, a controller 9 pilots the displacement of the hydraulic pump 7 so that it delivers a flow rate as a function of the rotational speed of the first axle 3. This flow rate is typically calculated so that the rotational speed of the wheels of the second axle 5 is equal to or substantially greater than the rotational speed of the wheels of the first axle 3, so as to provide assistance to the movement, and not to slow down the movement of the vehicle.

The displacement of the hydraulic pump 7 is thus determined to be equal to a target, typically fixed, value for each gearbox 2 ratio engaged. More specifically, as a function of the speed of the wheels (or the value of a parameter related thereto), and of the rotational speed of the hydraulic pump 7 (or the value of a parameter related thereto, for example the rotational speed of the engine 1), the theoretical displacement value corresponding to the desired flow rate is determined in order to drive the wheels 51 and 52 to the desired rotational speed. Considering a vehicle traveling under predetermined and constant conditions, the thus determined displacement value is therefore constant. The assistance pressure is then typically equal to 80 bars or more, depending on the desired tractive mode. It is however understood that in operation under real conditions, the target pressure and displacement value will change as a function of time, as a function of the rotational speed of the wheels of the main axle 3 driven by the engine 1 (or a parameter related thereto).

The present disclosure aims at making use of the hydraulic assistance transmission in particular in order to perform hill start assistance, in addition to the conventional functions of the assistance transmission.

The controller 9 is thus configured to pilot the hydraulic assistance transmission based on several parameters: the vehicle speed, the acceleration command and the brake command.

Figure 2:
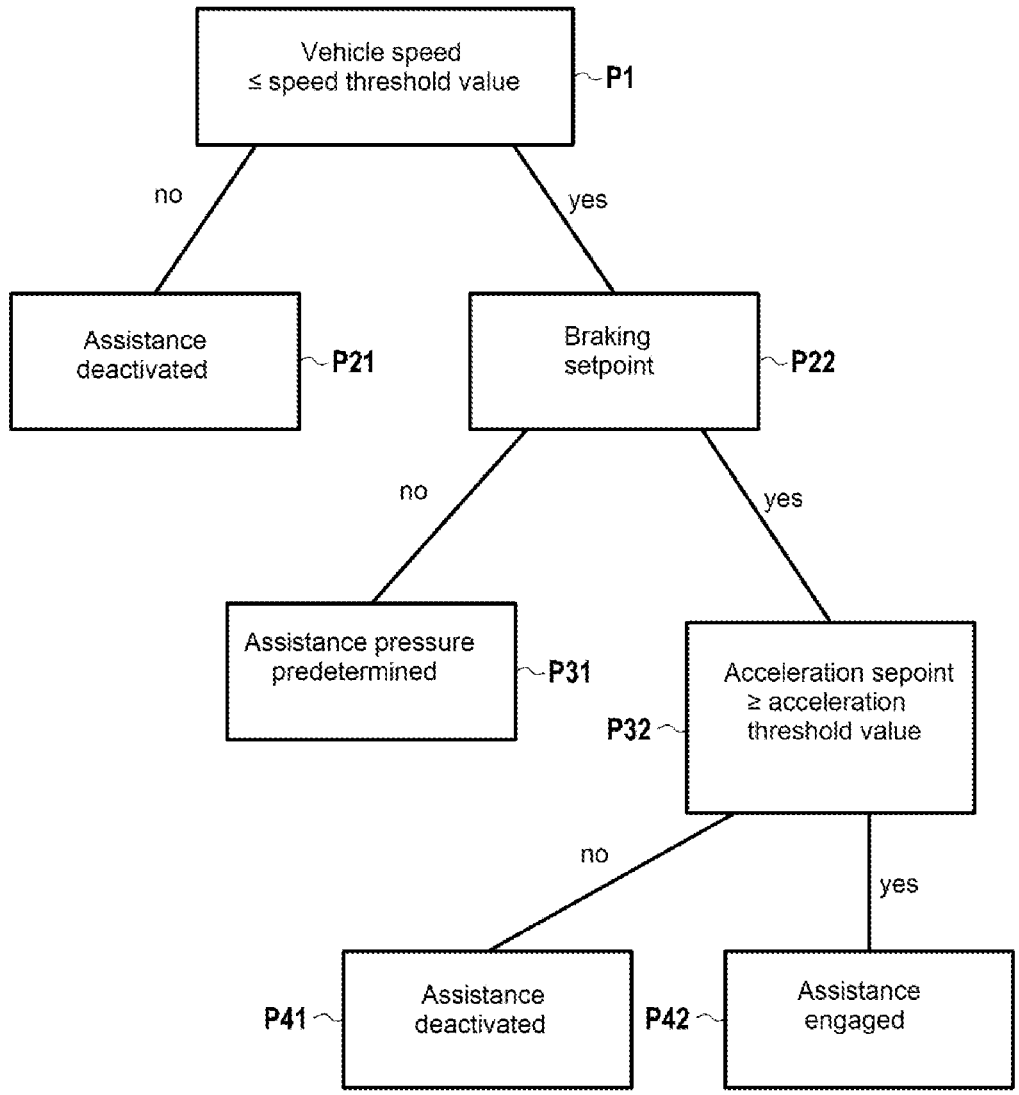

FIG. 2 is a diagram schematically representing the operation described below.

A first parameter taken into account is the speed of the vehicle (step P1). The hydraulic assistance transmission as considered is a "low speed"-type hydraulic assistance transmission. Thus, the controller 9 will automatically disengage the hydraulic assistance transmission as soon as the speed of the vehicle exceeds a speed threshold value, for example by making a "bypass" of the hydraulic motor 8, and/or by conferring a zero displacement to the hydraulic pump 7 (step P21). For example, the speed threshold value is comprised between 0 and 10 km/h, typically equal to 5, 6 or 7 km/h.

In the case where the speed of the vehicle is less than or equal to said speed threshold value, the controller 9 then determines whether a braking setpoint is applied (step P22), for example by the actuation by the user of a service or parking brake of the vehicle.

In the case where no braking setpoint is applied, the controller 9 pilots the displacement of the hydraulic pump 7 so that it delivers a flow rate as a function of the rotational speed of the first axle 3, as previously indicated (step P31).

In the case where a braking setpoint is applied, the controller 9 will then take into account the applied acceleration setpoint (step P32).

If the acceleration setpoint is lower than an acceleration threshold value, then the assistance hydraulic transmission is disengaged (step P41).

If the acceleration setpoint is greater than or equal to the acceleration threshold value, then the assistance hydraulic transmission is engaged so as to provide a tractive force to the vehicle (step P42). The acceleration threshold value is typically equal to 10%.

Such an operation differs from the conventional piloting methods in which the application of a braking setpoint necessarily causes the stop of the assistance transmission.

In contrast, the control method as proposed aims at taking into account an additional parameter, namely the acceleration of the vehicle, in order to determine whether the hydraulic assistance transmission should be engaged or not.

The acceleration setpoint applied to the vehicle indeed allows reflecting a hill start situation, in which the hydraulic assistance transmission can here be used in order to provide an additional tractive force to the vehicle and thus facilitate the hill start, particularly help maintaining the vehicle while the driver is performing the starting maneuver.

Indeed, the particular situation in which a user will simultaneously apply a braking setpoint and an acceleration setpoint is characteristic of a hill start situation.

According to one particular embodiment, when a hill start situation is detected, the controller can then pilot the hydraulic assistance transmission according to a specific setpoint, for example so as to deliver a torque greater than the torque delivered by the hydraulic assistance transmission at an equivalent speed but not in a hill start condition.

The control method as presented may apply whatever the direction of movement of the vehicle considered, in forward or reverse gear.

The controller 9 can also be associated with different sensors, in particular a vehicle inclination sensor, or a load sensor. A load sensor is in particular advantageous in the case of a vehicle intended to transport heavy loads and/or a coupler.

The association of such sensors with the controller can thus allow defining additional conditions for the hill start assistance function of the vehicle via the assistance transmission, under conditions in which the vehicle is not in slip condition.

Thus, the engagement of the hydraulic assistance transmission (step P42) may for example be subject to additional conditions in terms of load and/or inclination of the vehicle. For example, the hydraulic assistance transmission may be engaged only when the inclination of the vehicle exceeds an inclination threshold value, or when the load detected by the load sensor is greater than or equal to a load threshold value.

The engagement of the hydraulic transmission can also be considered in forward gear or reverse gear.

Alternatively, the indications provided by a slope or load sensor can allow modulating the tractive force provided by the assistance; the tractive force being then increased as a function of the value of the inclination and/or the value of the load.

Although the present invention has been described with reference to specific exemplary embodiments, it is obvious that modifications and changes can be made to these examples without departing from the general scope of the invention as defined by the claims. Particularly, individual characteristics of the various illustrated/mentioned embodiments can be combined in additional embodiments. Consequently, the description and drawings should be considered in an illustrative rather than restrictive sense.

It is also obvious that all the characteristics described with reference to one method can be transposed, alone or in combination, to one device, and vice versa, all the characteristics described with reference to one device can be transposed, alone or in combination, to one method.

The invention claimed is:

1. A method for controlling a vehicle comprising: a main transmission configured to exert a tractive force to drive in rotation a first set of wheels, and a hydraulic transmission configured to drive in rotation a second set of wheels, the vehicle being provided with a brake adapted to be controlled by a braking setpoint, wherein when the braking setpoint is not applied on the brake, and when the hydraulic transmission is activated, a hydraulic pump of the hydraulic transmission is piloted so as to establish a predetermined pressure within a hydraulic circuit of the hydraulic transmission, in case of the braking setpoint applied to the brake, the hydraulic transmission is then piloted as a function of an acceleration setpoint applied to the vehicle;

if the acceleration setpoint is greater than or equal to an acceleration threshold value, and a traveling speed of the vehicle is lower than or equal to a speed threshold value, the hydraulic transmission is piloted so as to exert the tractive force, if the acceleration setpoint is lower than the acceleration threshold value, the hydraulic transmission is disengaged.

2. The method according to claim 1, wherein the hydraulic transmission is disengaged when the speed of the vehicle exceeds the speed threshold value.

3. The method according to any of claim 1 or 2, wherein in case of the braking setpoint applied to the brake, the hydraulic transmission is also piloted as a function of an indication of an inclination of the vehicle.

4. The method according to claim 3, wherein the piloting of the hydraulic transmission so as to exert the tractive force is modulated as a function of the inclination of the vehicle.

5. The method according to claim 1, wherein in case of the braking setpoint applied to the brake, the hydraulic transmission is also piloted as a function of a load indication of the vehicle.

6. The method according to claim 5, wherein the piloting of the hydraulic transmission so as to exert the tractive force is modulated as a function of the load of the vehicle.

7. A vehicle comprising a first set of wheels and a second set of wheels, a main transmission configured to exert a tractive force to drive in rotation the first set of wheels, and a hydraulic transmission configured to drive in rotation the second set of wheel, a brake adapted to be controlled by a braking setpoint, the main transmission comprising an engine, the hydraulic transmission comprising a hydraulic pump and a hydraulic motor, the vehicle further comprising a controller configured to drive the hydraulic transmission according to the method of claim 1.

* * * * *